US008424027B1

(12) United States Patent  (10) Patent No.: US 8,424,027 B1
Hsu et al.  (45) Date of Patent: Apr. 16, 2013

(54) OPTICAL DISC DRIVE AND TRAY LOCKING DEVICE THEREOF

(75) Inventors: Cheng-Chung Hsu, Hsinchu (TW);
Yung-Han Wu, Hsinchu (TW);
Sz-Shian He, Hsinchu (TW);
Ming-Chun Tsao, Hsinchu (TW);
In-Shuen Lee, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 0 days.

(21) Appl. No.: 13/517,601

(22) Filed: Jun. 14, 2012

(30) Foreign Application Priority Data

Mar. 26, 2012 (CN) .......................... 2012 1 0081870

(51) Int. Cl.
*G11B 17/04* (2006.01)
(52) U.S. Cl.
USPC .......................................................... 720/610
(58) Field of Classification Search ............... 720/601, 720/637, 639, 672, 673, 610
See application file for complete search history.

(56) References Cited

U.S. PATENT DOCUMENTS

| 6,181,663 | B1* | 1/2001 | Kakuta et al. ................. 720/610 |
|---|---|---|---|
| 6,498,774 | B2* | 12/2002 | Kang et al. ..................... 720/610 |
| 7,073,183 | B2* | 7/2006 | Hekizono ....................... 720/610 |
| 7,127,727 | B2* | 10/2006 | Hsu et al. ....................... 720/637 |
| 7,386,867 | B2* | 6/2008 | Yang et al. ..................... 720/610 |
| 2003/0117929 | A1* | 6/2003 | Bae et al. ...................... 369/75.2 |
| 2005/0010937 | A1* | 1/2005 | Chen et al. .................... 720/610 |
| 2006/0161931 | A1* | 7/2006 | Chen et al. .................... 720/610 |
| 2006/0265722 | A1* | 11/2006 | Yang et al. .................... 720/610 |
| 2007/0028250 | A1* | 2/2007 | Chien et al. ................... 720/610 |
| 2007/0028252 | A1* | 2/2007 | Lee et al. ...................... 720/610 |
| 2012/0174134 | A1* | 7/2012 | Kim et al. ..................... 720/610 |

* cited by examiner

*Primary Examiner* — Brian Miller
(74) *Attorney, Agent, or Firm* — Jianq Chyun IP Office

(57) ABSTRACT

An optical disc drive is provided. The optical disc drive includes a housing having a protruding pin, an optical head engaged to a lead screw, a tray slidably disposed in the housing and a tray locking device disposed on the tray. The tray locking device includes a pushing member, wherein the pushing member and the optical head are driven by the lead screw to move, a latching hook used to latch and release the protruding pin, and a transmission assembly disposed between the pushing member and the latching hook. The transmission assembly has a driving portion disposed on a moving path of the pushing member, wherein the pushing member pushes the driving portion so that the transmission assembly is actuated and drives the latching hook to release the protruding pin.

8 Claims, 6 Drawing Sheets

OPTICAL DISC DRIVE AND TRAY LOCKING DEVICE THEREOF

CROSS-REFERENCE TO RELATED APPLICATION

This application claims the priority benefit of China application serial no. 201210081870.7, filed on Mar. 26, 2012. The entirety of the above-mentioned patent application is hereby incorporated by reference herein and made a part of this specification.

BACKGROUND OF THE INVENTION

1. Field of the Invention

The present invention relates to an optical disc drive. More particularly, the invention relates to an optical disc drive and a tray locking device thereof.

2. Description of Related Art

As the advanced development of computer technology largely increases, processing a variety of data types is increased and a larger storage capacity is also needed. Optical discs have the advantages of reasonable price, portability, large storage capacity, easy data storage, long storage term, secure storage of data, and so on, so the optical disc has gradually replaced the conventional magnetic storage medium and becomes an indispensable optical storage medium in modern life. With the widespread use of the optical disc, the optical disc drive for reading the data in the optical disc has also become a common electronic product in daily life.

In general, an optical head is disposed within the optical disc drive, and the optical head is driven to move forward and backward via driving members, such as a lead screw, so that the optical head can read the optical disc carried on the tray. Besides the above mentioned driving members such as a lead screw, some tray locking devices have to be disposed within the optical disc drive so as to fix the tray within the optical disc drive and release the tray when the tray is to be ejected under an ejection command, so that users can easily place or take out the optical disc.

In conventional optical disc drives, electromagnetic plungers or motors are used to control the locking or releasing of the tray. However, a large numbers of components have to be disposed within the optical disc drive and the space thereof is occupied, and it leads to restrict compactness of the optical disc drive and also increases the manufacturing cost.

SUMMARY OF THE INVENTION

The present invention provides a tray locking device of an optical disc drive, and the tray locking device provided in the present invention can save the number of components to be used therein and the internal space of the optical disc drive is also saved. Furthermore, the manufacturing cost can be effectively reduced.

An optical disc drive is provided in the present invention. The optical disc drive includes a housing having a protruding pin, an optical head engaged to a lead screw, a tray slidably disposed in the housing and a tray locking device disposed on the tray. The tray locking device includes a pushing member, wherein the pushing member and the optical head are driven by the lead screw to move, a latching hook used to latch and release the protruding pin, and a transmission assembly disposed between the pushing member and the latching hook. The transmission assembly has a driving portion disposed on a moving path of the pushing member, wherein the pushing member pushes the driving portion so that the transmission assembly is actuated and drives the latching hook to release the protruding pin.

A tray locking device used in the optical disc drive is further provided in the present invention. The tray locking device is used to latch and release a tray. The optical disc drive includes a housing having a protruding pin, an optical head engaged to a lead screw, a tray slidably disposed in the housing and a tray locking device disposed on the tray. The tray locking device includes a pushing member, wherein the pushing member and the optical head are driven by the lead screw to move, a latching hook used to latch and release the protruding pin, and a transmission assembly disposed between the pushing member and the latching hook. The transmission assembly has a driving portion disposed on a moving path of the pushing member, wherein the pushing member pushes the driving portion so that the transmission assembly is actuated and drives the latching hook to release the protruding pin.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
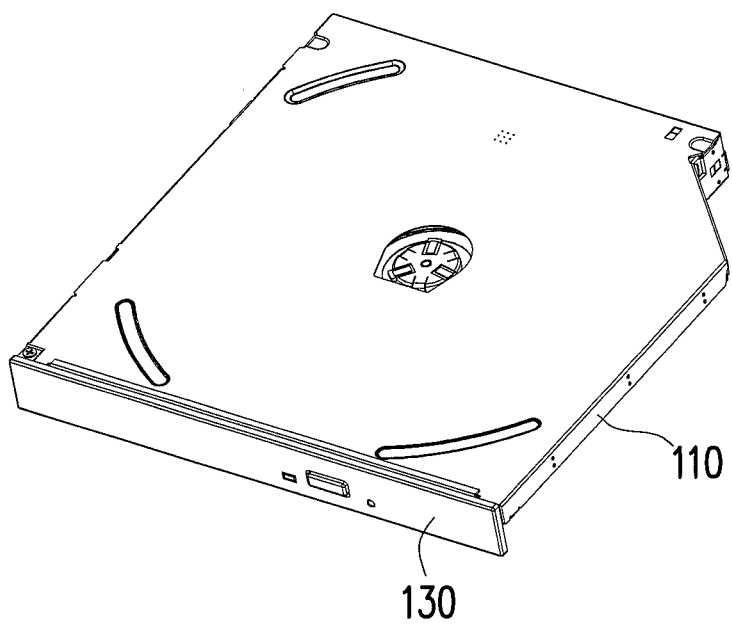
FIG. 1 schematically illustrates a perspective view of an optical disc drive according to one embodiment of the present invention.
Figure 2:
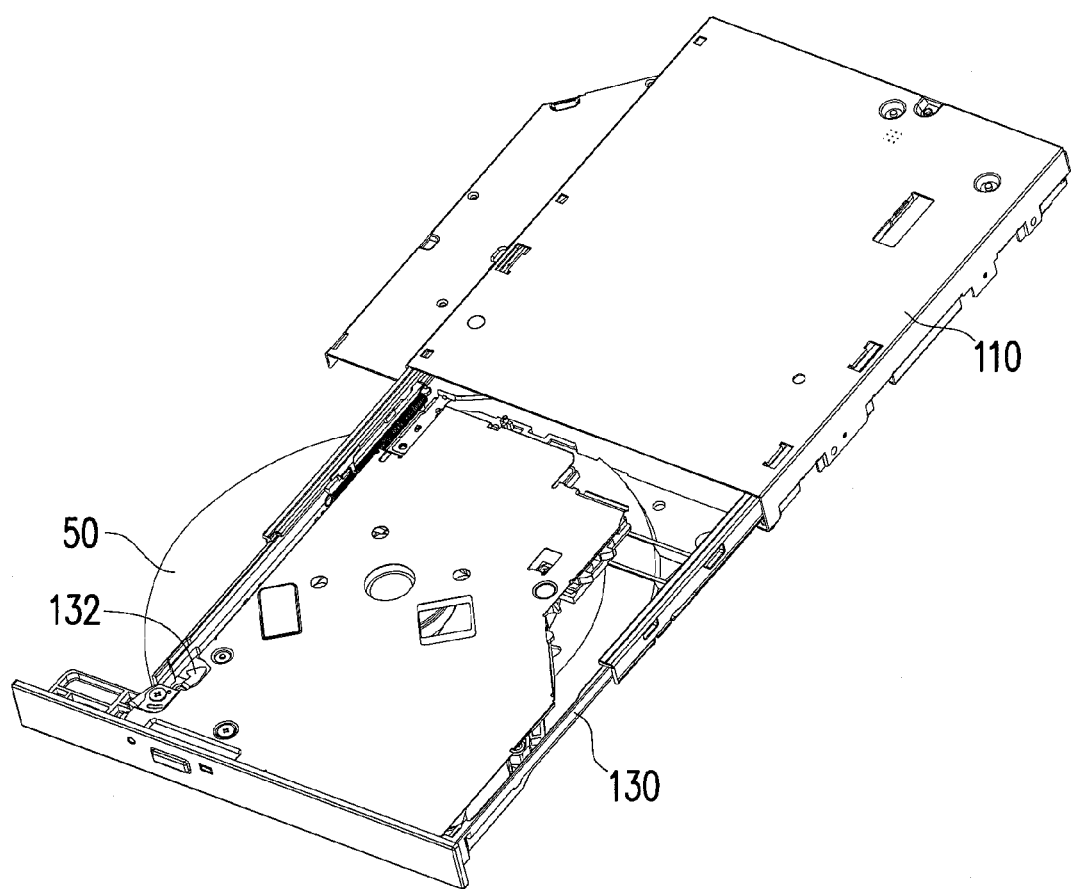
FIG. 2 is a schematic view showing the tray that is ejected from the optical disc drive of FIG. 1.
Figure 3:
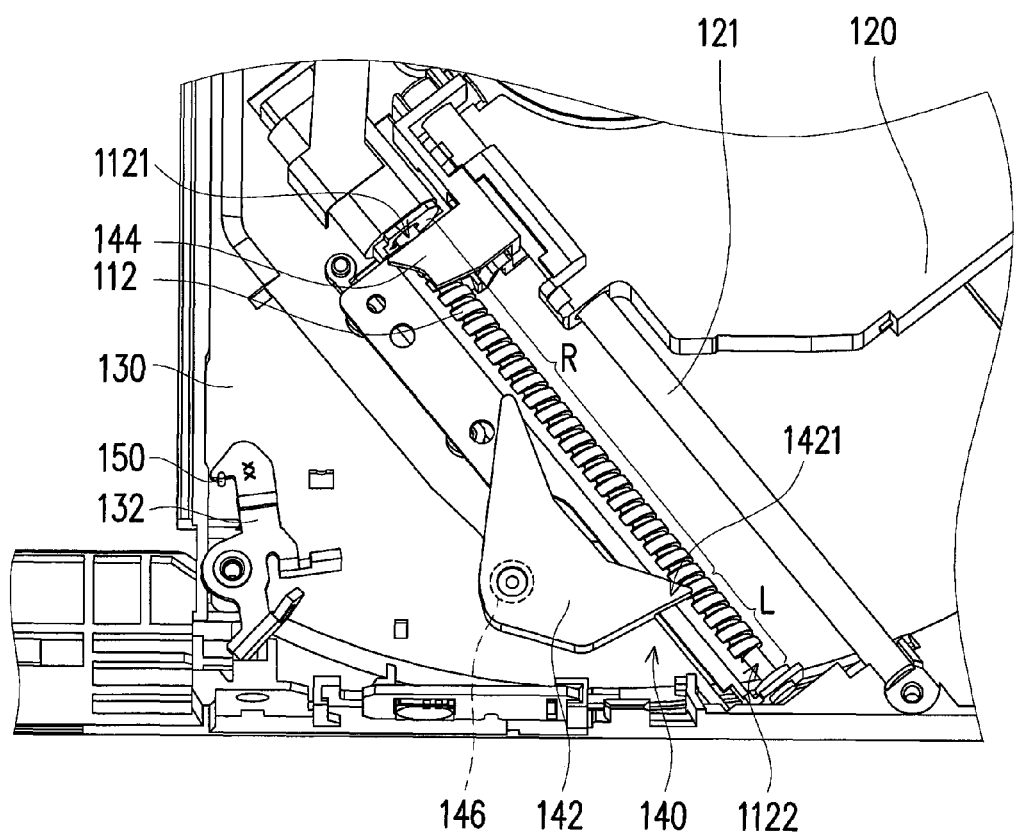
FIG. 3 is a schematic view of the tray locking device of the optical disc drive of FIG. 1.

FIG. 1 schematically illustrates a perspective view of an optical disc drive according to one embodiment of the present invention. FIG. 2 is a schematic view showing the tray that is ejected from the optical disc drive of FIG. 1. FIG. 3 is a schematic view of the tray locking device of the optical disc drive of FIG. 1. Referring to FIG. 1 to FIG. 3, the optical disc drive 100 of the embodiment includes a housing 110, an optical head 120, a tray 130, a lead screw 112 and a tray locking device 140. The optical head 120 is engaged to the lead screw 112, and when the lead screw 112 rotates, the lead screw 112 drives the optical head 120 to move along the lead screw 112 relatively. The tray 130 is slidably disposed in the housing 110 and has a locking position (as shown in FIG. 1) and an ejecting position (as shown in FIG. 2).

Please refer to FIG. 3. The tray locking device 140 of the embodiment includes a transmission assembly 142, a pushing member 144 and a latching hook 132. The latching hook 132 is pivoted in the optical disc drive 100 and used to latch and release a protruding pin 150 and further latch and release the tray 130. The pushing member 144 and the optical head 120 can be driven by the lead screw 112 to move. The transmission assembly 142 is disposed between the pushing member 144 and the latching hook 132, wherein the pushing member 144 pushes the transmission assembly 142 to make the transmission assembly 142 drive the latching hook 132 to rotate, so that the latching hook 132 releases the protruding pin 150 and the tray 130 can be ejected from the housing 110.

The transmission assembly 142 has a driving portion 1421 disposed on a moving path of the pushing member 144. The driving portion 1421 divides the lead screw 112 into a reading segment R and a loading segment L, wherein the reading segment R is the segment between the first end 1121 of the lead screw 112 and the driving portion 1421, and the loading segment L is the segment between the second end 1122 of the lead screw 112 and the driving portion 1421.

When the tray 130 is to be ejected, the lead screw 112 drives the pushing member 144 to move to the loading segment L from the reading segment R, and then the lead screw 112 drives the pushing member 144 to move to the reading segment R. By doing so, the driving portion 1421 of the transmission assembly 142 can be pushed by the pushing member 144 to actuate the transmission assembly 142 and to drive the latching hook 132 to rotate, so that the latching hook 132 releases the protruding pin 150 to make the tray 130 ejected from the housing 110.

In the embodiment of the present invention, the tray locking device 140 is disposed on the tray 130, and the protruding pin 150 is disposed on the housing 110, thus when the latching hook 132 of the tray locking device 140 is latched on the protruding pin 150, the tray 130 is also locked in the housing 110, and when the latching hook 132 releases the protruding pin 150, the tray 130 is ejected to the outside of the housing 110.

The transmission assembly of the embodiment of the present invention is disposed between the pushing member and the latching hook. The transmission assembly can be a single element, ex. a rotating rod, or a plurality of elements assembled together, wherein the transmission assembly is driven by the pushing member to drive the latching hook to operate. In the embodiment of the present invention, the transmission assembly 142 is a rotating element 142, for example. However, the transmission assembly of the embodiment is not restricted to be the rotating element. In other words, the transmission assembly can be a moving element or an assembly of a plurality of rods.

An exemplary embodiment is described in the following and illustrates the releasing process of the tray in which a rotating element 142 is used as the transmission assembly 142 in the exemplary embodiment.

Figure 4A:
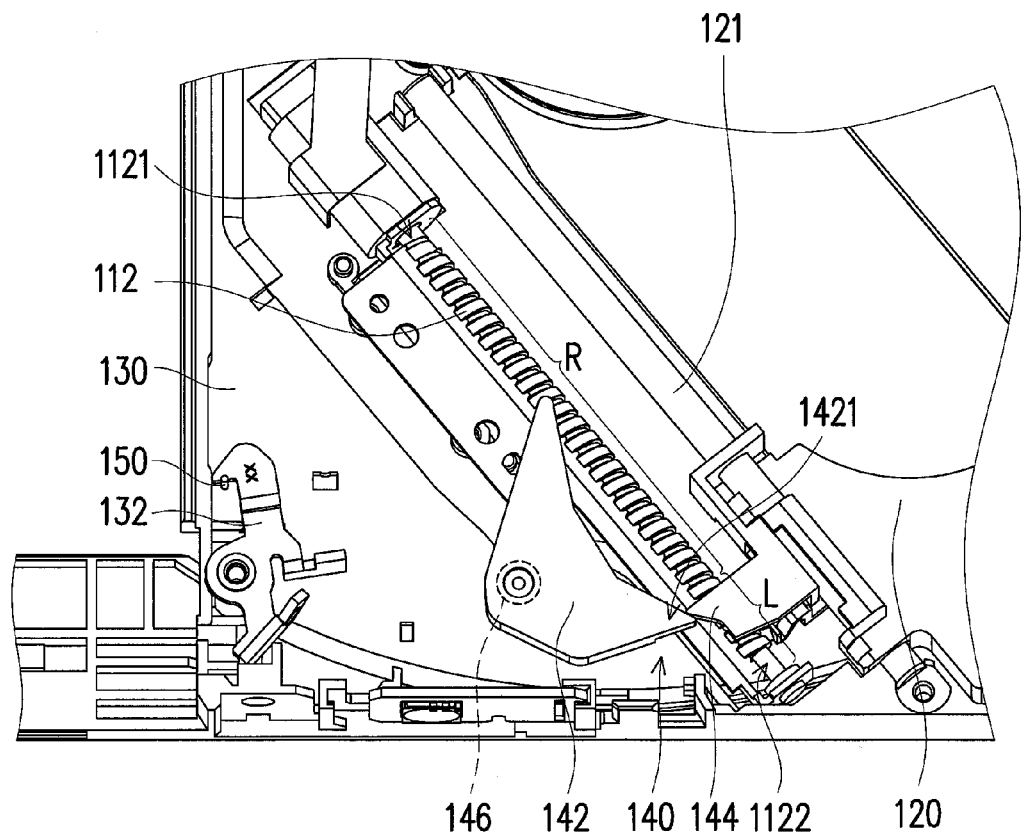
FIG. 4A to FIG. 4C schematically shows a releasing process of the tray of the tray locking device in FIG. 3.
Figure 4B:
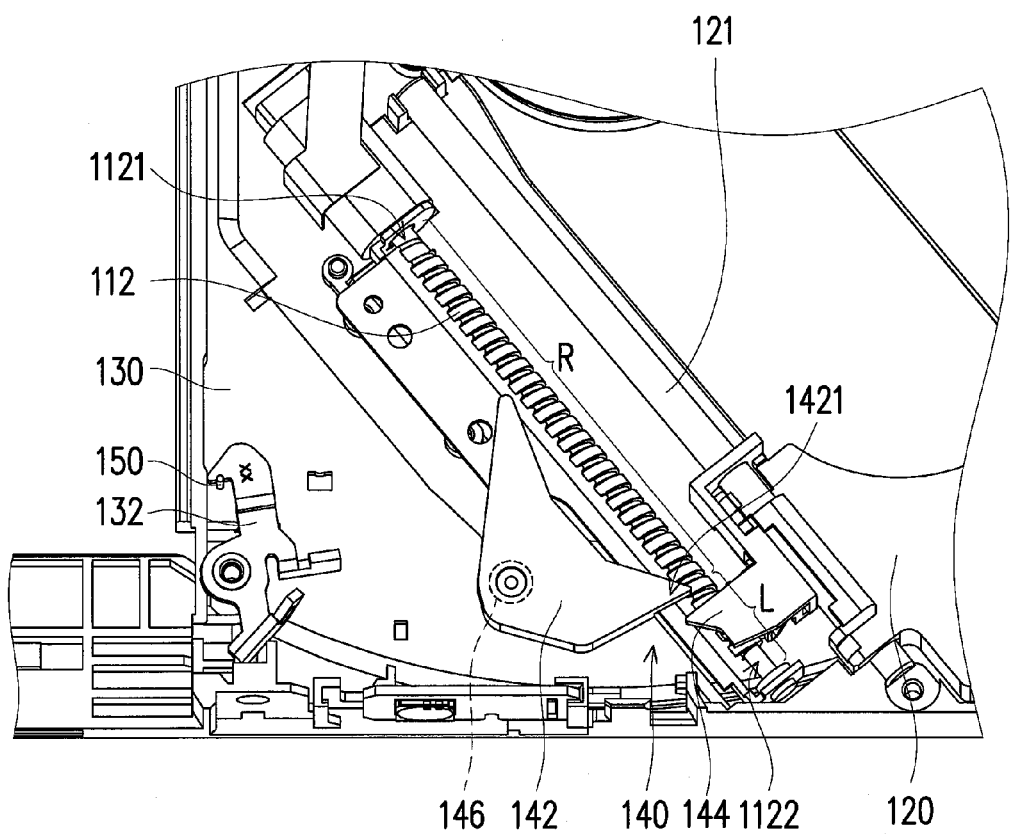
Figure 4C:
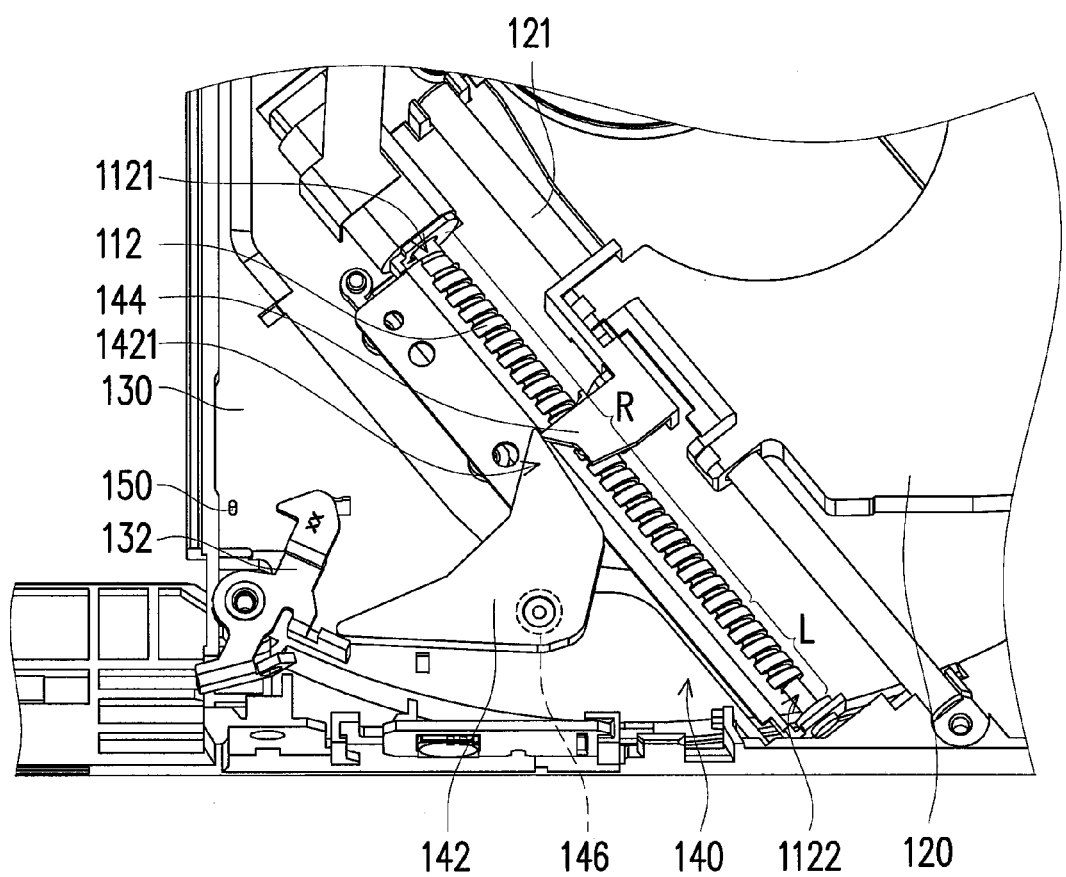

Referring to FIG. 4A to FIG. 4C, which schematically shows a releasing process of the tray of the tray locking device in FIG. 3. When a disc 50 is to be read in the optical disc drive 100, the lead screw 112 simultaneously drives the optical head 120 and the pushing member 144 to move in the reading segment R, i.e., to move between the first end 1121 of the lead screw 112 and the driving portion 1421. At this time, the tray 130 is latched in the housing 110, namely, the latching hook 132 is latched with the protruding pin 150.

When the tray 130 is to be ejected from the housing 110, the lead screw 112 drives the optical head 120 and the pushing member 144 to move toward the second end 1122 of the lead screw 112. The pushing member 144 pushes the pushing member 1421 so that the rotating element 142 rotates, as shown in FIG. 4A. Then, the lead screw 112 continues to drive the pushing member 144 to move toward the second end 1122 of the lead screw 112, so that the pushing member 144 moves into the loading segment L. In other words, the pushing member 144 is driven to move until it is between the second end 1122 of the lead screw 112 and the driving portion 1421, as shown in FIG. 4B. And then, the lead screw 112 is driven reversely, so that the optical head 120 and the pushing member 144 move toward the first end 1121 of the lead screw 112 to the reading segment R. At the same time, the pushing member 144 pushes the rotating element 142 to rotate reversely and drives the latching hook 132 to actuate to release the protruding pin 150, so that the tray 130 is unlatched and ejected from the housing 110 as shown in FIG. 4C.

According to the tray locking device of the embodiment of the present invention, the lead screw 112 not only can drive the optical head 120 to move to read the disc 50, it also can drive the pushing member 144 to push the transmission assembly 142 so that the transmission assembly 142 drives the latching hook 132 to actuate to release the tray 130 to be ejected from the housing 110. In other words, the existing lead screw 112 of the optical disc drive is used to drive the tray locking device, thus the internal space of the optical disc drive 100 can be saved and the fabricating cost can be reduced.

In the embodiment, both the pushing member 144 and the optical head 120 are slidably disposed on a guiding rod 121 and engaged to the lead screw 112. Accordingly, as shown in FIG. 4A, when the lead screw 112 simultaneously drives the optical head 120 and the pushing member 144 to move toward the second end 1122 of the lead screw 112 to reach the end position of the optical head 120, the lead screw 112 may continue to rotate. At this time, since the optical head 120 is already at the end position and unable to continue to move, tooth jump may occur between the lead screw 112 and the optical head 120. When the tooth jump occurs between the optical head 120 and the lead screw 112, the lead screw 112 may drive the pushing member 144 to move toward the second end 1122 of the lead screw 112, so that the pushing member 144 further pushes the transmission assembly 142 and enters the loading segment L, as shown in FIG. 4B. In other words, after the lead screw 112 drives the optical head 120 to move to the end position shown in FIG. 4A, it has to force to drive the pushing member 144, then the pushing member 144 can further move toward the second end 1122 of the lead screw 112 and pass through the driving portion 1421 of the transmission assembly 142 to reach the loading segment L.

According to the above mentioned embodiment, when an impact is exerted on the optical disc drive 100 so that the optical head 120 and the pushing member 144 move toward the second end 1122 of the lead screw 112 and reach the end position of the optical head, the position shown in FIG. 4A, since the optical head 120 has already reached the end position and may not continue to move, and the impact is hard to drive to cause the tooth jump between the pushing member 144 and the lead screw 112 due to, the small mass of the pushing member 144, the pushing member 144 may not continue to move toward the second end 1122 of the lead screw 112 because of the impact and pass through the transmission assembly 142. Accordingly, it can be prevented that when the optical disc drive 100 is subjected to the impact, the pushing member 144 enters the loading segment L by a mistake and the tray 130 is mistakenly released when the optical head 120 returns to the original position.

In the embodiment, both the pushing member 144 and the optical head 120 are slidably disposed on the guiding rod 121 and engaged to the lead screw 112. Nevertheless, the present invention should not be construed as limited to the embodiments set forth herein. In other embodiments, the pushing member 144 can also be fixed to the optical head 120, and when the lead screw drives the optical head 120, the pushing member 144 can move together with the optical head 120. In addition, the relative locations among the components can be suitably adjusted, so that the pushing member 144 fixed on the optical head 120 can move together with the movement of the optical head 120 and move toward the second end 1122 of the lead screw 112, and pass through the transmission assembly 142 and enter the loading segment L.

The tray locking device 140 of the embodiment further includes an elastic element 146 disposed on the rotating element 142. When the pushing member 144 pushes the rotating element 142, the elastic element 146 may store an elastic potential so as to draw back the rotating element 142.

In light of the foregoing, the lead screw of the embodiment of the present invention not only can drive the optical head to read the optical disc, it also can drive the tray locking device to unlatch the tray so that the tray can be ejected from the optical disc drive. In other words, the optical head and the tray locking device shares the existing lead screw, thus the internal space of the optical disc drive can be saved and the fabricating cost can be reduced.

In addition, a relatively sliding configuration of the optical head and the pushing member is provided in the embodiment of the present invention. And when the optical head reaches the end position, the lead screw forces and drives the optical head so that a tooth jump occurs between the optical head and the lead screw, and the pushing member is further driven to move relative to the optical head, pass through the transmission assembly and enter the loading segment. Accordingly, when the optical disc drive is subjected to an impact, the pushing member may not be able to continue to move because the optical head reaches the end position, thus the pushing member may not pass through the transmission assembly and enter the loading segment due to the impact, so that the tray may not be mistakenly released and ejected from the optical disc drive.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An optical disc drive, comprising:
   a housing having a protruding pin;
   an optical head engaged to a lead screw;
   a tray slidably disposed in the housing; and
   a tray locking device disposed on the tray, the tray locking device comprising:
      a pushing member, wherein the pushing member and the optical head are driven by the lead screw to move;
      a latching hook adapted to latch and release the protruding pin; and
      a transmission assembly disposed between the pushing member and the latching hook, wherein the transmission assembly has a driving portion disposed on a moving path of the pushing member, and the pushing member is adapted to push the driving portion so that the transmission assembly is actuated and drives the latching hook to release the protruding pin;
   wherein the lead screw is divided into a reading segment and a loading segment by the driving portion,
   wherein when a disc is to be read, the lead screw drives the pushing member and the optical head to move in the reading segment, and
   wherein when the tray is to be ejected, the lead screw drives the pushing member to move to the loading segment and then the lead screw drives the pushing member to move back to the reading segment.

2. The optical disc drive as claimed in claim 1, wherein the lead screw has a first end and a second end, the reading segment is between the first end of the lead screw and the driving portion, and the loading segment is between the second end of the lead screw and the driving portion.

3. The optical disc drive as claimed in claim 2, wherein when the lead screw drives the optical head to move to the second end, the lead screw further drives the pushing member so that the pushing member moves toward the second end, passes through the driving portion of the transmission assembly and enters the loading segment.

4. The optical disc drive as claimed in claim 2, wherein when the tray is to be ejected, the lead screw drives the pushing member so that the pushing member moves toward the second end, passes through the driving portion of the transmission assembly and enters the loading segment, after that, the lead screw drives the pushing member to move toward the first end again and push the driving portion so that the transmission assembly is actuated and drives the latching hook to release the protruding pin.

5. A tray locking device suitable to be used in an optical disc drive, adapted to latch and release a tray, the optical disc drive having an optical head engaged to a lead screw, the tray locking device comprising:
   a pushing member, wherein the pushing member and the optical head are driven by the lead screw to move;
   a latching hook adapted to latch and release a protruding pin to lock and release the tray; and
   a transmission assembly disposed between the pushing member and the latching hook, wherein the transmission assembly has a driving portion disposed on a moving path of the pushing member, and the pushing member is adapted to push the driving portion so that the transmission assembly is actuated and drives the latching hook to release the protruding pin;
   wherein the lead screw is divided into a reading segment and a loading segment by the driving portion,
   wherein when a disc is to be read, the lead screw drives the pushing member and the optical head to move in the reading segment, and
   wherein when the tray is to be ejected, the lead screw drives the pushing member to move to the loading segment and then the lead screw drives the pushing member to move back to the reading segment.

6. The tray locking device as claimed in claim 5, wherein the lead screw has a first end and a second end, the reading segment is between the first end of the lead screw and the driving portion, and the loading segment is between the second end of the lead screw and the driving portion.

7. The tray locking device as claimed in claim 6, wherein when the lead screw drives the optical head to move to the second end, the lead screw further drives the pushing member so that the pushing member moves toward the second end, passes through the driving portion of the transmission assembly and enters the loading segment.

8. The tray locking device as claimed in claim 6, wherein when the tray is to be ejected, the lead screw drives the pushing member so that the pushing member moves toward the second end, passes through the driving portion of the transmission assembly and enters the loading segment, after that, the lead screw drives the pushing member to move toward the first end again and push the driving portion so that the transmission assembly is actuated and drives the latching hook to release the protruding pin.

* * * * *